(12) United States Patent
Jones

(10) Patent No.: US 6,399,184 B1
(45) Date of Patent: Jun. 4, 2002

(54) PRECUT BLISTER ROLL FOR THERMOFORMER MACHINE

(75) Inventor: W. Charles Jones, East Sandwich, MA (US)

(73) Assignee: Emerging Technologies Trust, Osterville, MA (US)

(*) Notice: Subject to any disclaimer, the term of this patent is extended or adjusted under 35 U.S.C. 154(b) by 0 days.

(21) Appl. No.: 09/401,454

(22) Filed: Sep. 22, 1999

Related U.S. Application Data

(63) Continuation of application No. 09/071,440, filed on May 1, 1998, now Pat. No. 6,129,538.
(60) Provisional application No. 60/045,243, filed on May 1, 1997.

(51) Int. Cl.$^7$ ................................. B32B 3/00
(52) U.S. Cl. .................... 428/195; 428/43; 428/178; 428/192
(58) Field of Search ................ 206/461, 192, 206/564, 524.1, 820; 428/500, 195, 43, 178, 192

(56) References Cited

U.S. PATENT DOCUMENTS

| | | | |
|---|---|---|---|
| 1,797,568 A | 3/1931 | Dean | |
| 2,541,203 A | 2/1951 | Canfield | |
| 3,107,394 A | 10/1963 | Varon | |
| 3,161,915 A | 12/1964 | Thiel | |
| 3,333,032 A | 7/1967 | Dickinson | |
| 3,335,927 A | 8/1967 | Zwiebel | |
| 3,454,693 A | 7/1969 | Crenshaw | |
| 3,577,700 A | 5/1971 | Bippus et al. | |
| 3,667,885 A | 6/1972 | Shelby | |
| 3,733,160 A | 5/1973 | Neil | |
| 3,770,118 A * | 11/1973 | Jones | 206/47 |
| 3,830,611 A | 8/1974 | Irwin | |
| 3,867,085 A | 2/1975 | Lynch | |
| 3,867,088 A | 2/1975 | Brown et al. | |
| 3,868,209 A | 2/1975 | Howell | |
| 3,904,338 A | 9/1975 | Straumanis | |
| 3,925,140 A | 12/1975 | Brown | |
| 4,086,045 A | 4/1978 | Thiel et al. | |
| 4,105,386 A | 8/1978 | Thiel et al. | |
| 4,128,369 A | 12/1978 | Kemerer et al. | |
| 4,267,140 A * | 5/1981 | Meeker | |
| 4,451,249 A * | 5/1984 | DeBin | 493/204 |
| 4,552,709 A * | 11/1985 | Koger, II et al. | |
| 4,555,377 A * | 11/1985 | Whiteside et al. | |
| 4,778,372 A * | 10/1988 | Mutti et al. | |
| 5,015,430 A * | 5/1991 | Suzuki et al. | |
| 5,167,781 A * | 12/1992 | Kemerer et al. | |
| 5,382,148 A * | 1/1995 | Buckley | |
| 5,620,715 A * | 4/1997 | Hart et al. | |
| 5,683,340 A * | 11/1997 | Belias et al. | 493/195 |

* cited by examiner

Primary Examiner—Bruce H. Hess
Assistant Examiner—Michael E. Grendzynski
(74) Attorney, Agent, or Firm—Leslie Meyer-Leon, Esq.; IP Legal Strategies Group P.C.

(57) ABSTRACT

The present invention is a thermoformer which produces zero scrap during the heating, forming and cutting of a blister package. In one embodiment, the thermoformer comprises a precut roll having a series of adjacent webs connected by a cut area. Each of the webs are defined by an overall length L, a width W, and a radius R. Each of the cut areas are defined by a cut depth D1, said cut depth D1 being in the range of about 25% to 90% of the width W of the webs. The thermoformer further comprises a heating station adapted to heat each of the webs. The thermoformer further comprises a forming station adapted to form each of the webs. The thermoformer further comprises a cutting station adapted to separate the webs from each other, by making a cut along each of the cut areas connecting the webs.

13 Claims, 5 Drawing Sheets

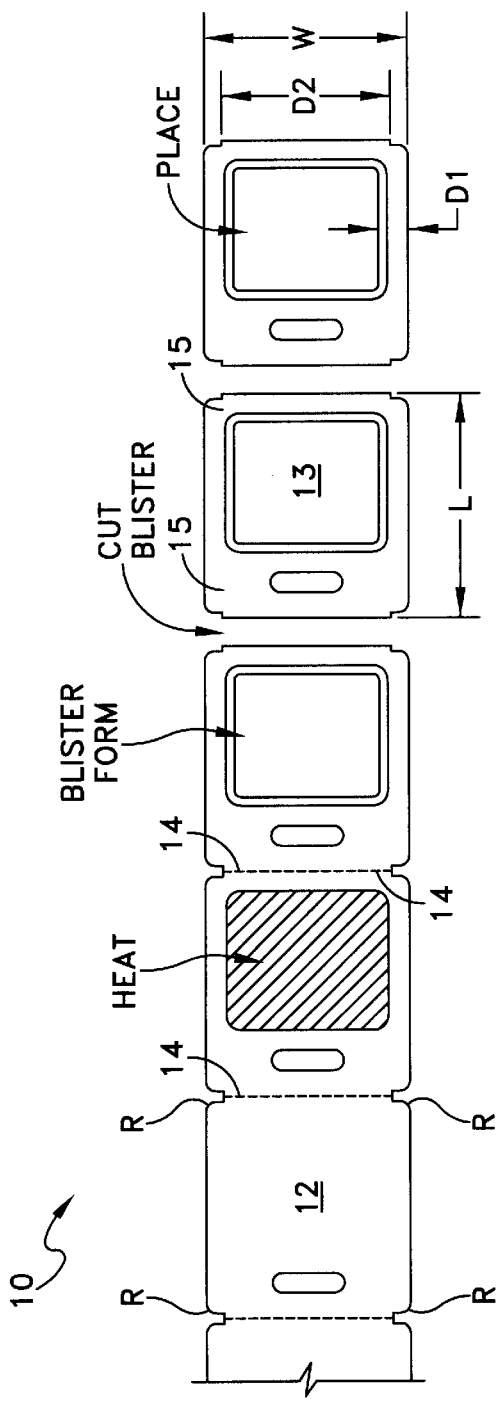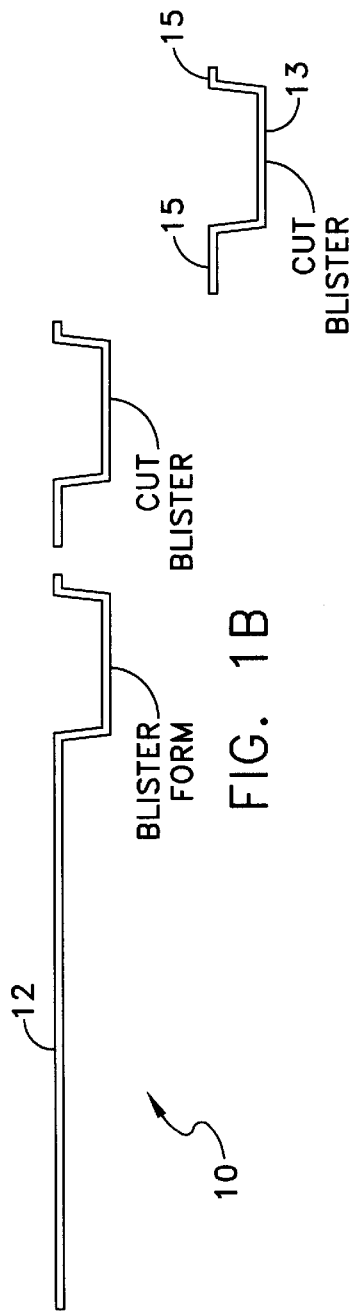

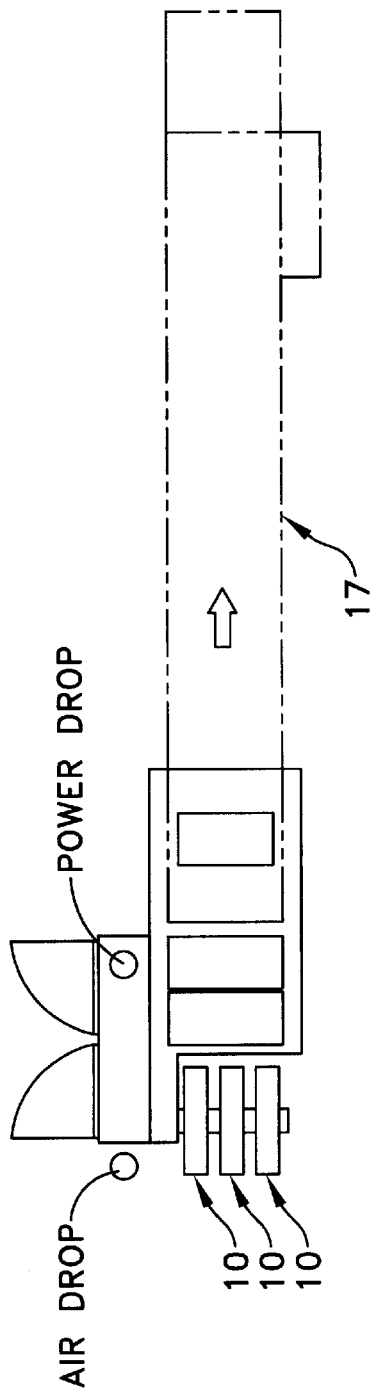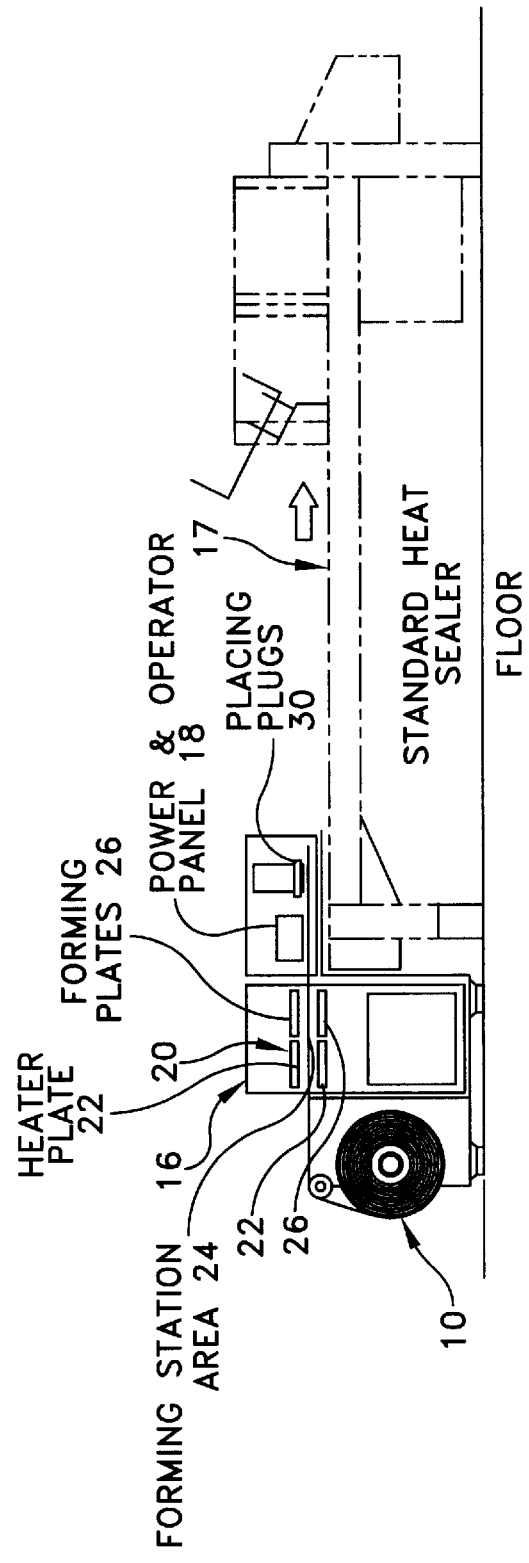

PRECUT BLISTER ROLL FOR THERMOFORMER MACHINE

REFERENCE TO PRIOR APPLICATIONS

This application is a continuation of U.S. patent application Ser. No. 09/071,440, filed May 1, 1998, now U.S. Pat. No. 6,129,538, issued, Oct. 10, 2000, which application is based on, and claims the priority date of, U.S. Provisional Patent Application Serial No. 60/045,243, filed May 1, 1997.

FIELD OF THE INVENTION

The present invention relates generally to the field of thermoformer and heat sealer machines. More particularly, the present invention relates to the field of thin wall packaging used in connection with thermoformer machines.

BACKGROUND OF THE INVENTION

Thermoformer machines are typically used to form and cut a blister-type package from a stock roll of material, such as polyvinyl chloride (PVC), polyethylene terephthalate (PET) and/or polystyrene. Thereafter, the formed package is delivered to a heat seal machine, where an article is inserted within the formed package and the formed package is then sealed to a backing material. Such conventional thermoformer machines are not without drawbacks. First, use of a stock roll of material requires the thermoformer to include a trim press operation to cut the stock roll to the desired shape of the blister package. Use of a trim press operation produces a significant amount of scrap material to be discarded and increases the overall time it takes to produce a formed package. Second, conventional thermoformer machines typically stack the formed and cut blister packages for delivery to the heat sealing machine. The stacking of such blister packages requires that such blister packages be formed and cut by the thermoformer to have a non-zero draft side wall, so that such blister packages can be removed from each other and fed to the heat sealer machine.

SUMMARY OF THE INVENTION

The present invention is a thermoformer which produces zero scrap during the heating, forming and cutting of a blister package. In one embodiment, the thermoformer comprises a precut roll having a series of adjacent webs connected by a cut area. Each of the webs are defined by an overall length L, a width W, and a radius R. Each of the cut areas are defined by a cut depth D1, said cut depth D being in the range of about 25% to 90% of the width W of the webs. The thermoformer further comprises a heating station adapted to heat each of the webs. The thermoformer further comprises a forming station adapted to form each of the webs. The thermoformer further comprises a cutting station adapted to separate the webs from each other by making a cut along each of the cut areas connecting the webs.

BRIEF DESCRIPTION OF THE DRAWINGS

The following detail description of the invention will be better understood with reference to the accompanying drawings in which:

FIG. 1A is a schematic, top plan view of the precut roll of the present invention; and the stages of the roll with FIG. 1B illustrating the underlying sectional views.

FIG. 3 is a top plan view of the first embodiment;

FIG. 4 is a side elevation view of the first embodiment;

DETAILED DESCRIPTION OF THE PREFERRED EMBODIMENTS

Figure 2:
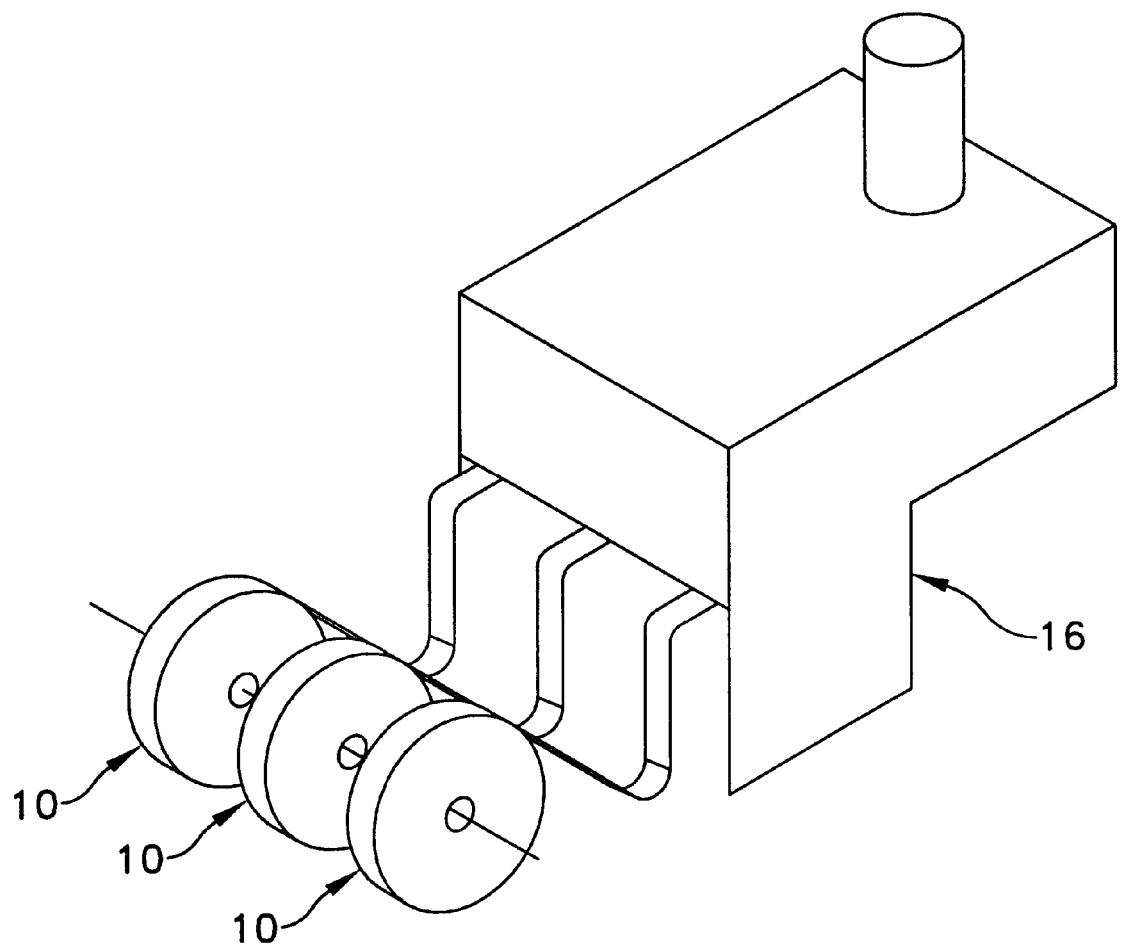
FIG. 2 is a perspective view of a first embodiment of the thermoformer machine of the present invention used in connection with a conventional sealing machine.
Figure 5:
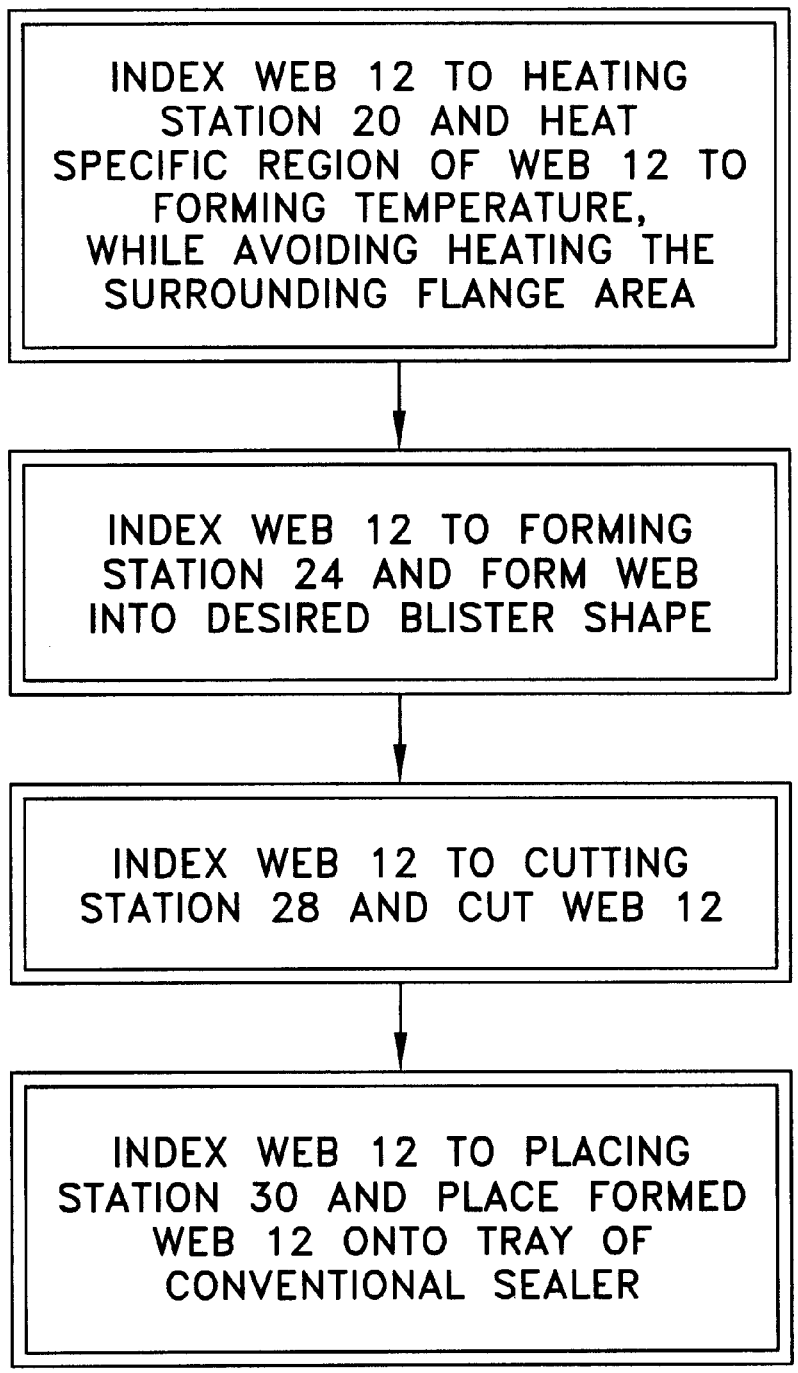
FIG. 5 is a flow chart showing the operation of the first embodiment.

FIG. 1A illustrates, in a schematic, top plan view, the roll 10 with web 12 and with cut areas 14 of a defined width (W), length (L), and depths (D1) and (D2), at various stages or stations, i.e., from a roll supply station; a heating station; a forming station; a cutting station; and a placing station of a thermoformer machine. FIG. 1B illustrates, in a sectional view, the various stations or stages of FIG. 1A.

Referring to FIG. 1, wherein the precut roll 10 forms a thermoformer material supply station is shown comprising a series of webs or segments 12. Each of the webs 12 have an overall length L and a width W. The length L and width W may vary, depending upon the desired size of the blister to be formed and would preferably be in the range of one (1) inch to eight (8) inches. Unlike conventional thermal plastic rolls, each of the webs 12 of the precut roll 10 are precut to a cut depth D1 and a radius R, leaving only a cut area 14 having a width D2 connecting one web 12 to another. The amount of precut for each of webs 12 may vary, depending upon the desired size of the blister to be formed and type of thermoplastic material used. Preferably, each of the webs 12 would be precut so that the depth D1 would be about 25% to 90% of the overall width W of the web 12 with the corners of each web 12 having a radius R in the range of about 0.125 inches to 0.500 inches. Although not shown, the thickness of precut roll 10 may vary, depending upon the desired size of the blister to be formed and type of thermoplastic material used. Preferably, the thickness of precut roll 10 is in the range of 0.006 to 0.060 inches. Each web 12 further comprises a blister portion 13 and a flange portion 15.

Referring to FIGS. 2, 3, and 4 wherein the thermoformer machine 16 is shown adjacent, and in cooperation with, a conventional heat sealer machine 17. The thermoformer machine 16 generally comprises an operator panel 18, which controls the various features, i.e. indexing and operation of the machine.

The thermoformer machine 16 further comprises a heating station 20 which is generally adapted to heat each web 12. Heating station 20 may comprise a variety of conventional mechanisms for heating each web 12. In the embodiment shown, heating station 20 comprises upper and lower heater plates 22, which are brought into contact with each web 12 to heat the same.

The thermoformer machine 16 further comprises a forming station 24 which is generally adapted to form each web 12 into the desired blister shape. Forming station 24 may comprise a variety of conventional mechanisms for forming each web 12. In the embodiment shown, forming station 24 comprises upper and lower forming plates 26, which are brought into contact with each web 12 to form the same.

The thermoformer machine 16 further comprises cutting station 28 which is generally adapted to cut each web 12 along the cut area 14. Cutting station 28 may comprise a variety of conventional mechanisms for cutting each web 12. In the embodiment shown, cutting station 28 comprises one of a variety of well-known Cutting means common in the industry, such as a guillotine or transversing shear, which are brought into contact along cut area 14, to cut each web 12.

The thermoformer machine 16 further comprises a placing station 30 which is generally adapted to place each web 12 into a tray of the heat sealer machine. Placing station 30 may comprise a variety of conventional mechanisms for placing each web 12 into the tray of the heat sealer machine 17. In the embodiment shown, placing station 30 comprises a generally vertically moving set of suction cups or placing vacuum plugs 31.

The precut roll 10 may be made from a variety of thermoplastic materials, such as PVC, PET, and/or polystyrene.

Figures 6, 7:
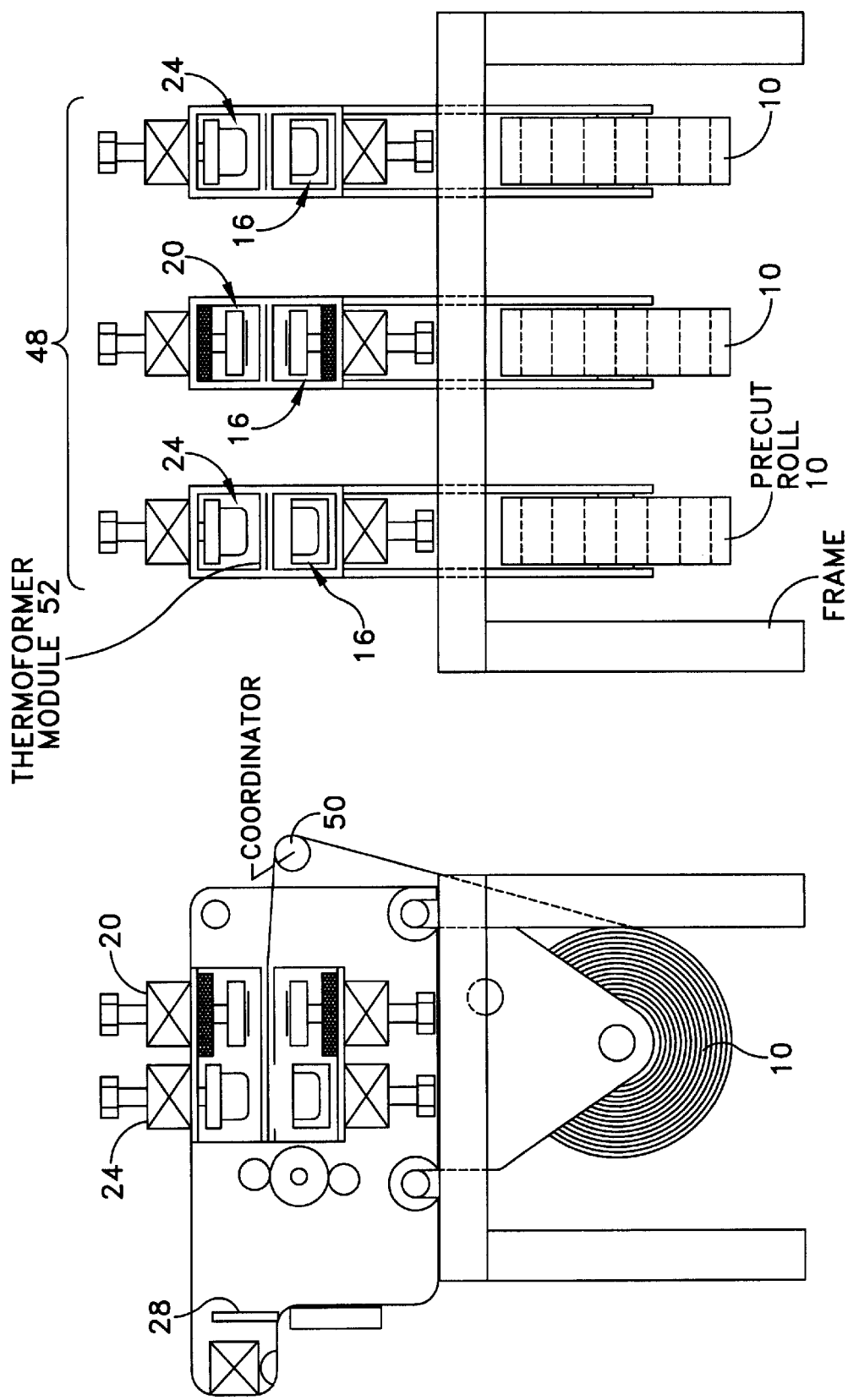
FIG. 6 is a side cut-away view of a second embodiment of the thermoformer of the present invention.
FIG. 7 is an end cut-away view of the second embodiment.

The present invention offers significant advantages over conventional devices. By way of example only, consider the following:

(1) the use of the precut roll 10 to be fed into a thermoformer 16 of FIG. 2 and 48 of FIG. 7 offers significant advantages over conventional devices, in that, the present invention eliminates the need for a trim press in a simple former that can be connected directly to an existing heat sealer;

(2) the present invention further takes newly formed blister, cuts it from the web 12 and places it into the sealing tray. Since the blisters are not stacked, they may be designed with a zero draft side wall, which is not possible with existing magazine fed heat sealers;

(3) the present invention also utilizes specific heat regions, by contact heat, proximity heat, or aperture directed forced hot air, to allow the blisters to be formed without orientating (or heat deforming) the flange area of the blister. This eliminates the problem of "cold formed" blisters, wherein the flange deforms under heat and pulls away from the seal area producing a defective seal. Forming parts with this method produces zero trim scrap during the forming and cut process. The use of multiple rolls allows for the direct match up with seal tray cavities.

FIGS. 6 and 7 illustrate a second embodiment of the present invention showing a thermoformer 48. In the second embodiment, the thermoformer 48 comprises three (3) thermoformer modules 52 aligned in parallel. Each thermoformer module 52 has a heating station 20 a forming station 24, and a cutting station 28. A precut or pre-fabricated roll 10 is provided and fed into each thermoformer module 52. Indexing of each precut roll 10 is controlled by a single roller 50, so that each of the precut rolls 10 are indexed or moved through its corresponding thermoformer module 52 at the same time. The roller 50 may be controlled by a variety of means, such as a clutch brake (not shown) or controller module (not shown). Although modular thermoformer 48 is shown with three (3) thermoformer modules 52, there may be more or less than three. In the preferred embodiment, the number of thermoformer modules 52 is dependent upon the number of heat sealers employed (i.e., one thermoformer module 52 for each heat sealer).

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of skill in the art.

What is claimed is:

1. A thermoplastic material for use in a blister thermoformer machine to provide a formed blister with a peripheral flange, which material consists of a single continuous sheet and comprises a plurality of generally longitudinally-aligned, connected webs, each of the webs having a selected width (W), length (L), corners with a radius (R), and a cut depth (D1) at each end of each of said webs which is less than the width (W).

2. The material of claim 1, wherein the cut depth (D1) is about 25 to 90 percent of the width (W).

3. The material of claim 1, wherein the radius (R) is in the range of about 0.125 to 0.500 inches.

4. The material of claim 1, wherein the material has a thickness suitable for forming a blister.

5. The material of claim 4, wherein the material has a thickness in the range of 0.006 to 0.060 inches.

6. The material of claim 1, wherein the thermoplastic material is selected from the group consisting of polyvinyl chloride (PVC), polyethylene terephthalate (PET), and polystyrene.

7. The material of claim 1, wherein said webs are connected by a transverse cut area (D2) at each end of the web, wherein (D2) is less than the width (W).

8. The material of claim 1, wherein the width (W) ranges from about one to eight inches.

9. The material of claim 1, wherein the length (L) ranges from about one to eight inches.

10. The material of claim 1, wherein each corner of each of the webs is a generally rounded corner of the same radius (R).

11. A stock roll of thermoplastic material for use in a thermoformer blister machine comprising the material of claim 1 in roll form around a shaft.

12. The roll of claim 11, wherein said roll is self-supported.

13. A plurality of parallel, spaced-apart rolls of claim 11 on a common shaft.

* * * * *

UNITED STATES PATENT AND TRADEMARK OFFICE
CERTIFICATE OF CORRECTION

PATENT NO.    : 6,399,184 B1                                                      Page 1 of 1
DATED         : June 4, 2002
INVENTOR(S)   : William Charles Jones It is certified that error appears in the above-identified patent and that said Letters Patent is hereby corrected as shown below:

<u>Title page,</u>
Title, please delete "BLISTER"

Signed and Sealed this

Twenty-ninth Day of October, 2002

Attest:

Attesting Officer

JAMES E. ROGAN
*Director of the United States Patent and Trademark Office*